(12) United States Patent
Wien

(10) Patent No.: US 8,174,398 B2
(45) Date of Patent: May 8, 2012

(54) LEAK SENSOR MONITOR

(76) Inventor: Abraham Wien, Miami, FL (US)

( * ) Notice: Subject to any disclaimer, the term of this patent is extended or adjusted under 35 U.S.C. 154(b) by 495 days.

(21) Appl. No.: 12/534,036

(22) Filed: Jul. 31, 2009

(65) Prior Publication Data

US 2011/0025511 A1 Feb. 3, 2011

(51) Int. Cl.
*G08B 21/00* (2006.01)

(52) U.S. Cl. .............. 340/605; 340/606; 73/40.5 R

(58) Field of Classification Search .......... 340/605, 340/603, 606, 611, 626; 73/40, 40.5 R
See application file for complete search history.

(56) References Cited

U.S. PATENT DOCUMENTS

| | | | | |
|---|---|---|---|---|
| 3,664,357 A | * | 5/1972 | Kreiss | 73/40.5 R |
| 5,254,976 A | * | 10/1993 | Schueler | 340/605 |
| 5,554,976 A | * | 9/1996 | Miyauchi et al. | 340/626 |
| 5,866,802 A | * | 2/1999 | Kimata et al. | 73/40.5 R |
| 6,317,051 B1 | * | 11/2001 | Cohen | 340/603 |
| 7,561,057 B2 | * | 7/2009 | Kates | 340/605 |

* cited by examiner

*Primary Examiner* — John A Tweel, Jr.

(57) ABSTRACT

A sensor leak monitor device that consists of well known elements arranged in a novel manner such that it can detect an involuntary consumption and alert a person when such is occurring. A pressure gage coupled with a timing device measures in a constant manner the internal pressure of a pipe and establishes a reference pressure. Upon the opening of any outlet of the network, the measured pressure will fall below this reference pressure value. If the measured pressure does not return to the reference pressure value within a stipulated time, it would be safe to assume that involuntary consumption is happening. Temperature is monitored and reported whenever it reaches a very low or freezing level. The device provides for audio and visual alerts to bring about the correction of the involuntary situation.

19 Claims, 5 Drawing Sheets

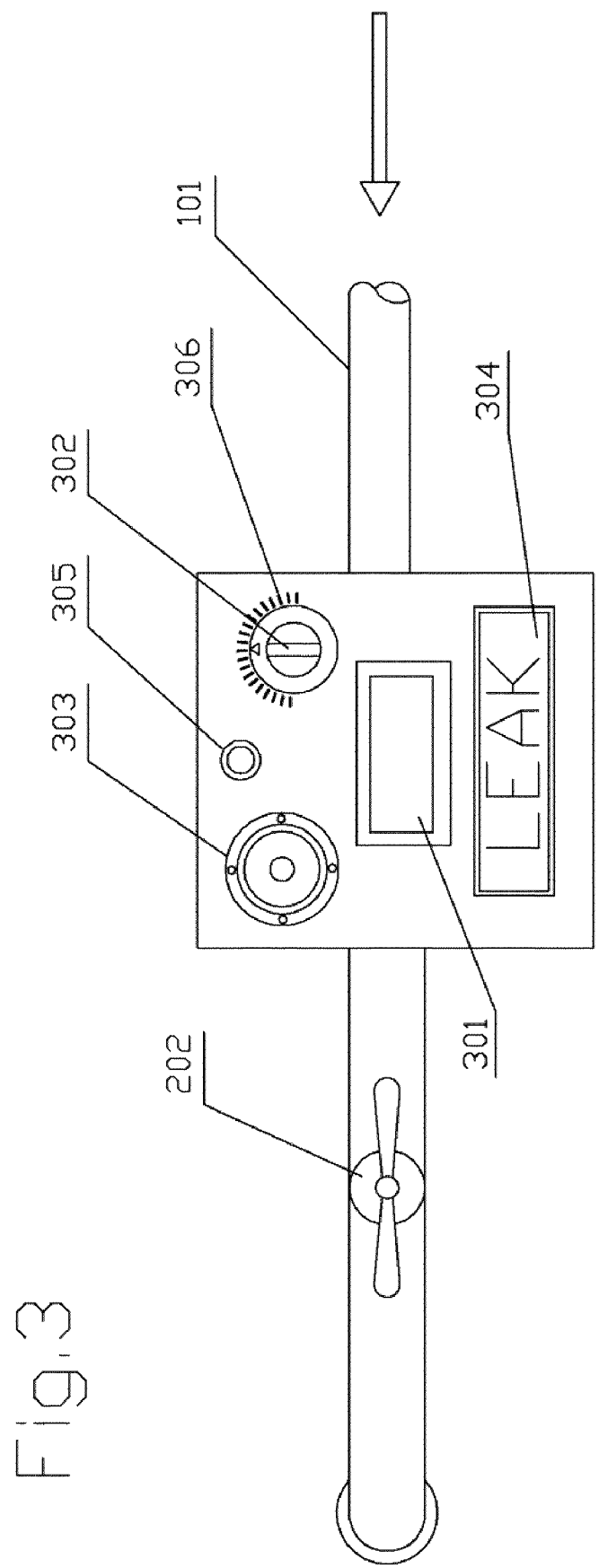

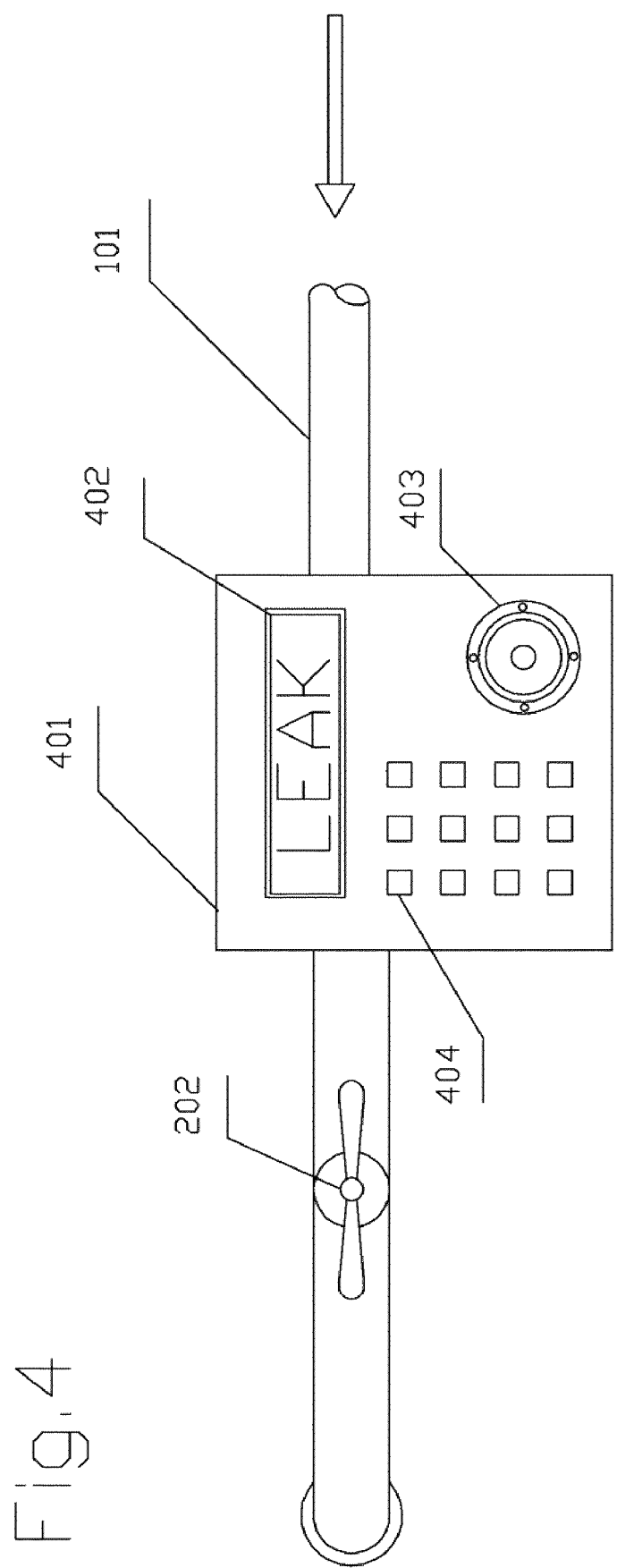

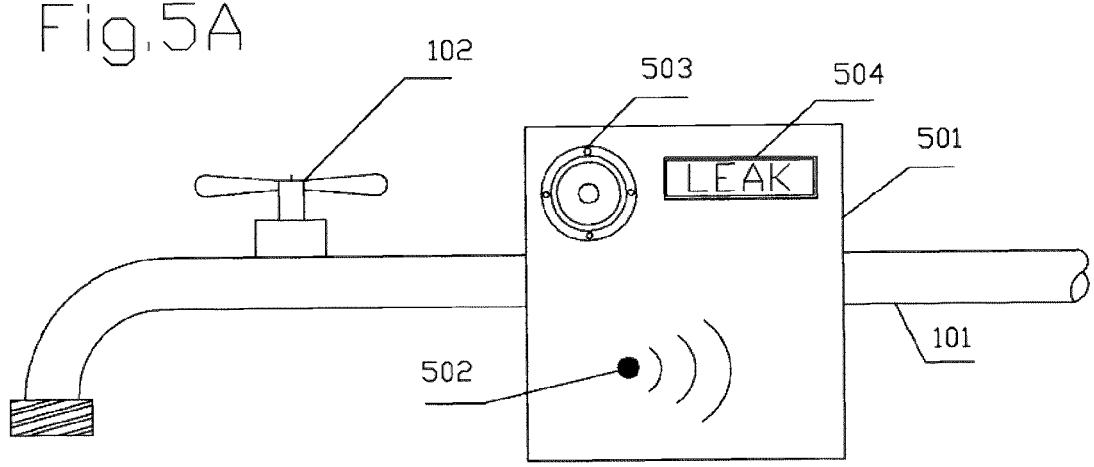
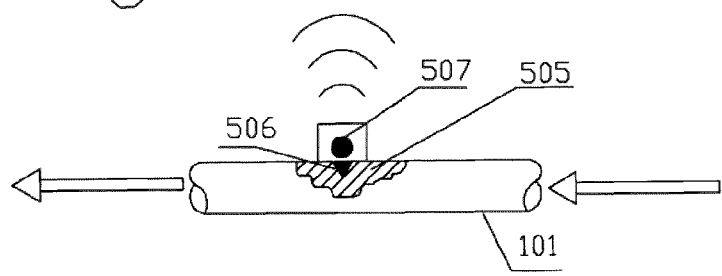
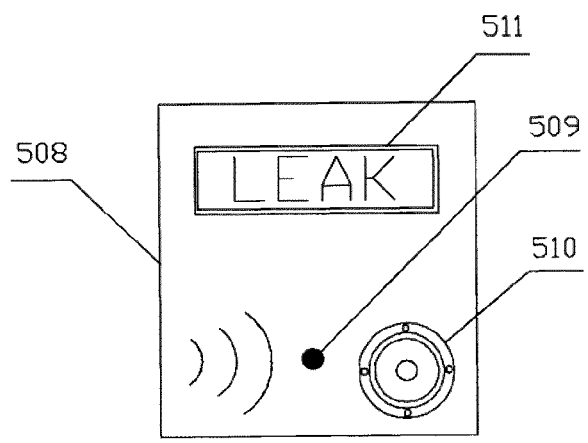

LEAK SENSOR MONITOR

BACKGROUND OF THE INVENTION

1. Field of the Invention

This invention generally relates to device that detects water leaks originating from a fractured conduit pipe, faulty flow control valve, or improperly closed shut-off valve. More specifically, this invention relates to a device that monitors a reference, or steady state, pressure of a conduit pipe, measures a predetermined elapsed time from the moment the conduit pipe's pressure deviates from the reference pressure, and notifies an observer that said time has elapsed. Furthermore, the inventive device monitors the temperature of the water, in one or more points of the conduit pipe, and notifies an observer before its temperature is about to reach a predetermined temperature point.

2. Prior Art

Originally humans considered the availability of drinking water to be almost infinite. Water, as an indispensable and necessary condition of life, was routinely mismanaged and misappropriated for every conceivable use. Civilization and urban sprawl exacerbated the demands and misuses for all available sweet water sources.

Water delivery to human habitats evolved over time from the simple retrieval of sweet water at a water stream's edge, through access by perforation of the earth to an underground water reservoir or stream, until modern days' access through a piped delivery system that includes methods for delivery and control of its flow.

Modern day human dwellings and habitats normally include a multiplicity of points of access to water. These water access points are interconnected by a network of pipes, frequently embedded in the habitat's structure walls and floors, and are controlled by one or more flow shut-off valves. These networks of pipes provide a conduit to deliver water by manual or automatic activation of flow control and/or shut-off valves interspersed on the network of pipes and at the point of access.

A typical human habitat may include, amongst other water points of access, faucets for wash basins, refrigerator's water dispensers, stoves, ovens, kitchen sinks faucets, toilets reservoirs, showers, washing machines, lawn sprinklers, water heaters, swimming pools, water fountains, and a plurality of indoor and outdoor water access points for a myriad of uses.

Many water access points maybe controlled by manually activating shut-off valves, such as that contained in a faucet. Other water access points maybe controlled by fill and shut-off valves, such as in the case of toilet reservoir, water heaters, and swimming pool fill up valves.

Old pipes routinely fracture causing varied amounts of involuntary water leakage. Since the bulk of the network of pipes is embedded in the habitat's structure or underground, a pipe fracture may cause one or more water leaks that can go undetected for long time, at least until evidence of the leakage is visually noticed. Alternative evidence of a long running water leakage may be noticed when a water flow measuring device indicates abnormal usage, as compared with previous water usage. Yet other evidence could be identified by a hissing noise that alerts a listener, or a mold growth that becomes visible. The ultimate notice of a long running leak is when a structure collapses from a damaged structural support component. In addition to fractured pipes, faulty and improperly closed shut-off valves routinely allow water to leak involuntarily. A leak from an improperly shut-off valve or from a pipe fracture that goes unnoticed for a long time can cause the collapse of an entire structure.

Another cause of pipe fracture is the expansion of the water contained therein as its temperature gets close to its anomaly point. As the water temperature falls below 8° C. it ceases to contract and begins expanding until it reaches 4° C. A repeated cycle stresses a pipe and causes pipe fatigue and eventually causes its fracture. If the water freezes, upon its liquefaction an undetected pipe fracture may occur that cannot be detected by a pressure measuring device and thus cause an unnoticeable leak.

While less than 50 years ago the cost of water was either non-existent or insignificant, today's water bill can be substantial, and is ever increasing. The need to control water leaks is evident since, on the aggregate, these leaks are beginning to cost society not only money but the ability to continue human habitation in many drought prone and less fortunate areas of the Earth.

BRIEF SUMMARY OF THE INVENTION

This invention is advanced to address the unmet need to control involuntary leaks primarily occurring in a water delivery network, pipes and valves; however its application is not restricted to any particular type pipe or conduit nor to any type of liquid, colloidal, or gaseous material conveyed through a piped network. While the hereinafter description refers to pipes in a house, conveying water, the invention may be applied to the control of any involuntary pipe leakage, conveying any liquid, gas, or colloidal material, and to the valves that regulate access to it. By house it is understood any type of building, whether residential or commercial, that has a water supply and an independent water meter.

Home water consumption varies according with the task it is applied to. Considering water use as a function of time while water runs in a continuous and uninterrupted manner, short uses of water may include, for example and without limitation, that of a sink or a basin faucet, a toilet reservoir fill up, a refrigerator water dispenser, and similar uses. Medium uses of water may include a washing machine tub fill up, an average shower, the fill up of a standard bathtub, the manual watering of a garden, and similar uses. Long uses of water may typically include timed irrigation, swimming pool fill ups, and other extraordinary long uses.

While short water uses may allow water to flow continuously from a few seconds to a few minutes (typically 3'-7'), medium water uses may last from a few minutes to less than thirty minutes, and long water uses regularly exceed thirty minutes and can run to a few hours. The possibility exist that by happenstance, a series of concatenating water usage events that would normally be classified as short term uses, may, on the aggregate, result on a medium or long water uses.

Normally, when there is no usage of water anywhere in the pipe network, the supply pressure at a given point on the pipe network remains constant. Let's call this constant supply pressure, at a particular point and time on the pipe network, reference pressure. When a valve is opened, or an involuntary flow occurs, such as for example when a pipe fractures, the supply pressure falls below the reference pressure. Once the water usage ceases, the shut off valves are closed, and no involuntary leaks occur, the supply pressure returns to the reference pressure.

The inventive device monitors the duration of a single event where the water pressure remains below the reference pressure. Considering the particular needs and typical uses of a household, the inventive device may be set to monitor an arbitrary and predetermined amount of time of uninterrupted water flow. The predetermined time will include the time spent in normal usage plus an allowance for likely concatenating water usage events will be contained and completed within that time.

At the end of each water-usage event the water supply pressure returns to the level of the reference pressure and resets the event timer. If at the expiration of the predetermined amount of time the water pressure does not return to reference pressure, there is a likelihood that a valve remained open or a pipe has fractured. Any water flow that cannot be attributable to an appliance, faucet, or other water consuming device, could be assumed to be caused by either a partially open shut-off valve or a network pipe fracture. This unaccounted flow is commonly referred to as a leak. Even a small leak, such as that occurring when a manually shut off valve is not fully closed, or when a pipe cracks while embedded in the ground, will prevent the pipe pressure from returning to reference pressure.

The invention's basic premise is that a continuous water flow, after certain amount of time, can only be attributed to a leak. For example, a house may have a timed irrigation system that could be set to be active for one hour. An unforeseen concatenating water usage event, such as a shower or bathtub fill up may extend the water usage in a continuous manner for up to two hours. This rough estimate takes into account that just before shutting off the irrigation valves another water usage commenced, such as a bathtub filled up followed seamlessly by some other uses. Yet, at the end of this period of time there should be at least one interlude when the water stops flowing completely and the supply pressure returns to reference pressure. When the pipe pressure does not return to its reference pressure value, it would be safe to assume that a leakage is occurring somewhere in the pipe system.

The inventive device further monitors the temperature of the material being transported through the conduit pipes. The object of monitoring the temperature of the material is to detect a situation where the pressure created by freezing said material, for example water, can fracture a pipe and upon thawing and create a leak, which may not be detected by using pressure monitoring device alone. Sometimes pipes, such as those used for lawn irrigation, may be exposed to the inclement weather. When the outside temperature falls below the water's anomaly point the internal pipe pressure will increase because of the expansion of the water molecules, and may result on a fractured pipe. While many sprinkling systems may provide for a method to drain the pipes that may be exposed to freezing temperatures, it is human nature to forget. A suitable warning about a frozen pipe will alert a consumer to verify a pipe that was exposed to freezing.

The inventive device consists of four well known elements that are coupled in an inventive manner to produce a novel and useful device. The first element is a pressure gage, commonly referred to as a manometer, which is capable of measuring a pipe's internal supply pressure. In the present implementation the manometer has a coupled memory feature that records a pressure reading and allows for its future retrieval and comparison of a measured pipe pressure. The pipe pressure measured at one particular time and location, and when there is no voluntary or involuntary flow through the pipe, is designated as reference pressure. The memory feature may be implemented in a mechanical or electronic version that is well known to a person skilled in the arts. In the mechanical manner, the return of the pipe pressure to reference pressure will cause the manometer needle to trigger and release a countdown timer. In the electronic manner, the return to reference pressure will simply reset a digital or analog electronic countdown timer. A second element is a timing device that is capable of measuring time from the moment the pipe's pressure deviates from the reference pressure until it returns to the same measurement. The timing device is also capable of resetting itself if, at any point prior to the expiration of the predetermined time, the measured pressure returns to the initial reference pressure reading. Furthermore, if the measured pressure has not yet returned to the reference pressure upon the expiration of a predetermined time the timing device is capable of activating an audiovisual alarm. The timing device may be mechanical or electronic in versions that are well known to a person skill in the arts.

A third element is a temperature measuring device, such as a thermocouple, a thermometer, and other similar devices well known to a person skilled in the art, which is in contact with the material carried through the conduit pipe. These measuring devices may be positioned on one or more strategic locations, such as where there is a high probability of reaching very low or freezing temperatures. These devices may be wired or wirelessly connected to the inventive device main body.

A fourth element is an audiovisual alarm that is capable of issuing a visual and/or audible signal to alert an observer informing that the measured pressure has not yet returned to the reference pressure prior to the expiration of the predetermined time, or that a section of the pipe has fallen below a specified temperature. In an enhanced version the alarm may be coupled with a transmitting device to relay to a remote audiovisual display notice of the expired time and/or low temperature, and thus alert a remote observer. The implementation of these alarms is well known to a person skill in the arts. In case any part of the inventive device is implemented in an electronic version, a power source, such as one or more batteries, is used to supply its electronic needs. The elements are preferably coupled into single unit; however the temperature measuring device and the alarm may be located in a remote location and connected via wire or wireless connection to the inventive device. The inventive device may be interspersed at any point on the piped network. An alternative embodiment may further include a valve actuator device, capable of closing a flow shut-off valve upon the expiration of the predetermined amount of time, as measured by the timing device.

Although only one device is needed to monitor an entire pipe network, a higher reliability may be attained by placing a plurality of devices at various points in the pipe network.

DRAWINGS

FIG. 3 shows a top view of example of an embodiment of the invention utilizing a mechanical manometer and electrical audiovisual alarm.

FIG. 4 shows a top view of example of an embodiment of the invention utilizing an electronic manometer, user interface buttons, and audiovisual alarms.

FIG. 5A shows a side view of example of an embodiment of the invention utilizing an electronic manometer and transmitter to actuate remote audiovisual alarms.

FIG. 5B shows a pipe with a section cut off showing a temperature sensor connected to a transmitting device.

FIG. 6 shows a device with reception capabilities and one or more audio visual alarms.

DETAILED DESCRIPTION OF THE INVENTION

Figure 1:
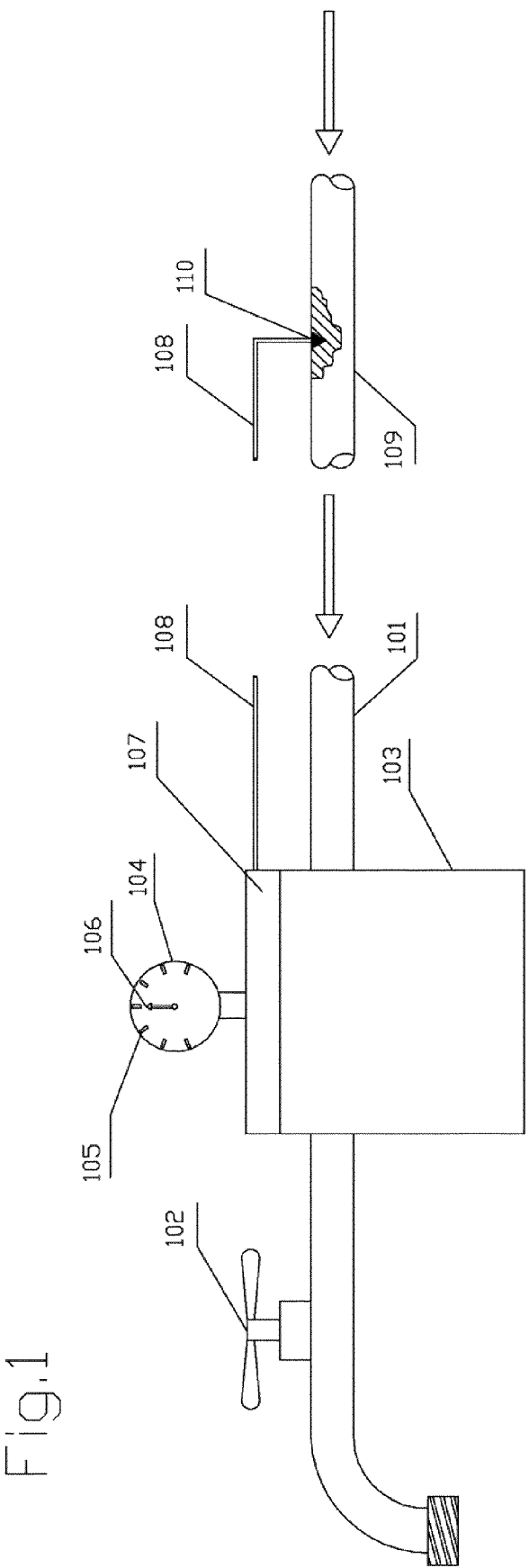
FIG. 1 shows a side view of an example of an embodiment of the invention utilizing a mechanical manometer.

The inventive sensor leak monitor may be used to detect a leak on an entire pipe network. The inventive device may be interspersed anywhere in the pipe network, preferably in a convenience place such as adjacent to a faucet. FIG. 1 depicts an example of an embodiment of the invention, showing a side view of the inventive monitor utilizing a mechanical manometer.

A water supply pipeline 101 is shown as capped by a manual shut-off valve, or faucet, 102. Interspersed between the water supply pipeline 101 and the faucet 102 is a sensor leak monitor 103, as implemented in a mechanical version. The inventive device 103 consists of a pressure sensor, or manometer, 104 that provides a visual reading of the water supply pipeline 101 pressure.

When the faucet 102 is closed, and no other voluntary or involuntary water consumption takes place, the pressure of the water supply pipeline 101 as measured by the manometer 104 is considered as the reference pressure 105. Any water consumption, caused by the opening the faucet 102, or other shut off valve in the pipe network, will cause the pressure measuring by the manometer 104 to fall below the reference pressure 105 to a lesser value 106.

FIG. 1 also shows an energy source 107, such as a battery, to supply the electric needs of audiovisual alarms, a temperature measuring device, and/or transmitter/receiver.

The inventive device is further shown in FIG. 1 connected through a wire 108 to a remote location on the pipe 109 that may be exposed to very low or freezing temperatures. A temperature measuring device 110 is positioned at the end of the wired connection 108 to read and transmit a temperature reading that reaches or falls below a predetermined setting.

Figure 2:
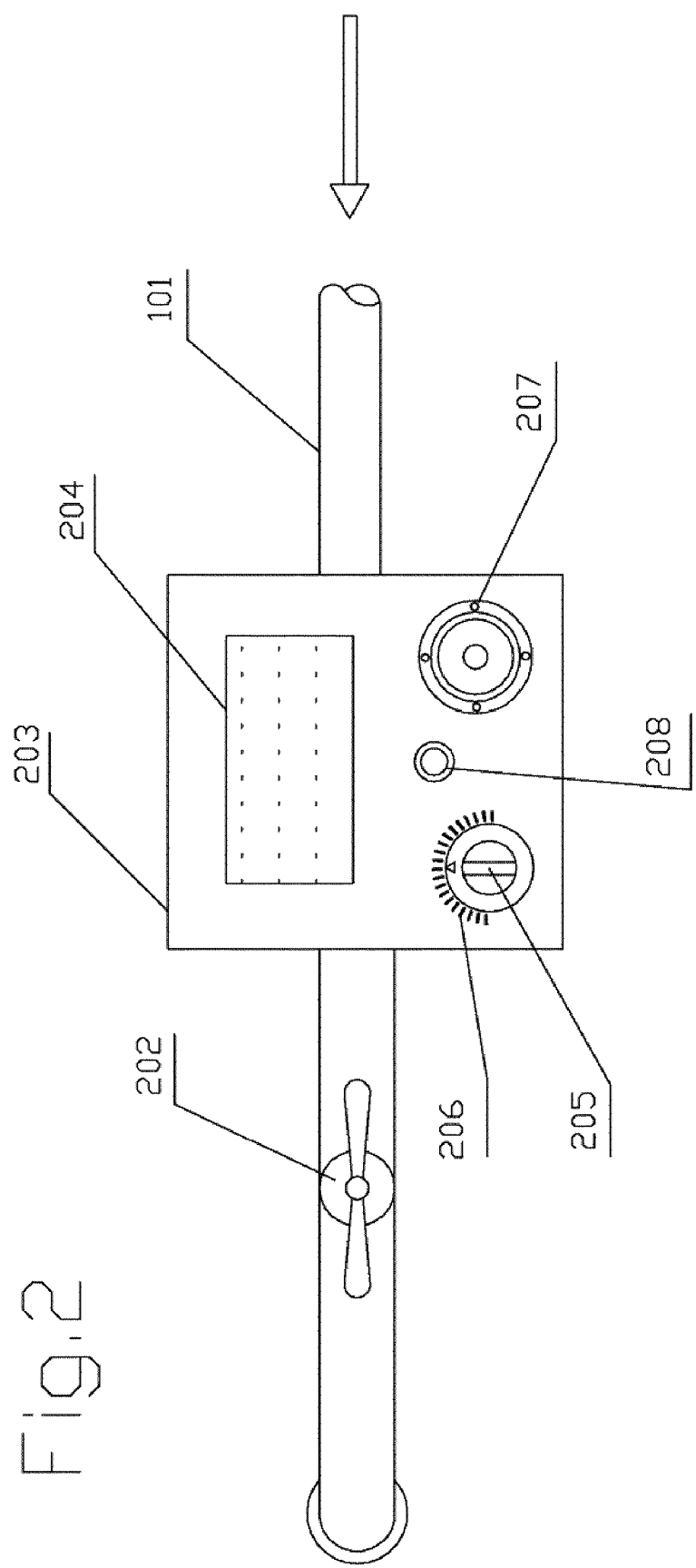
FIG. 2 shows a top view of example of an embodiment of the invention utilizing a mechanical manometer and alarm.

FIG. 2 shows a top view of example of an embodiment of the invention's audiovisual alarms. In this view, the inventive device 203 could be implemented completely in a mechanical fashion. As known by persons skilled in the art, a manometer 204 does not require electricity to function and may be implemented entirely by mechanical means. A knob 205 can be manually turned to spring load a mechanical clock 206 to preset a time upon the expiration of which a mechanical alarm, not shown, is released and an alarm bell 207 is rung. The kinetic energy of the mechanical clock's spring may be transformed into electricity to power a warning light 208 for a few minutes or alternatively a battery, not shown, may be used to provide energy to light up the warning alarm light 208.

FIG. 3 shows a top view of an embodiment of the invention utilizing a manometer 301, and audio 303 and visual, such as a textual display 304 and warning light 305, alarms. A knob 302 allows for the setting of a preset time 306 to be measured every time the manometer's 301 pressure reading falls below the reference pressure 105. When the preset time 306 elapses and the measured pressure 106 has not returned to the reference pressure 105, the alarms, 303 and 304, are triggered and they emit an audible alert sound and/or a verbal alert message through a speaker 303 and display a readable message 304, such as, for example, LEAK.

This particular embodiment provides for an electrically operated audible alarm 303 that can reach several decibels of pitch thus be audible at a distance. This particular embodiment depicts an optional reading display 304.

FIG. 4 shows a top view of example of an embodiment of the invention 401 utilizing an electronic manometer, user interface buttons 404, and audiovisual alarms. Often, electronic implementations of devices such as the pressure sensor leak monitor can be achieved in smaller, less expensive, and more accurate versions. The only drawback of electronic devices is the requirement for power supply and a reminder to maintain the power supply active.

In this embodiment, the inventive device 401 is shown from the top and contains a reading display 402, used to textually interface with the user, confirm time settings, display various parameters including, but not limited to, measured and reference pressures, preset and elapsed times, and to provide a textual alert when a leak occurs, a user interface area, in this example depicted by buttons 404, and an audible alarm speaker 403. A user initially sets up the inventive device's time parameters by inputting the preset time through the user interface buttons 404. Upon the inventive device activation, a manometer (not shown) records the actual pressure of a closed pipe network and establishes a reference pressure 105. Upon the opening of any shut off valve, such as a faucet 202, the measured pressure 106 falls and activates a timing device (not shown) that may display the elapsed time on a reading display 402. If the measured pressure 106 returns to reference pressure 105, then the timer resets itself, otherwise the timer issues a command to the audible alarm 403 to emit a sound or verbal message and to the display to read a message such as LEAK.

There are times when is more convenient to have an additional alarm located away from the pressure sensor leak monitor, such as when the building occupants may not be able to respond timely to a leak alert. FIG. 5A depicts such an embodiment of the invention that provides remote measuring and alerting capabilities. The inventive device 501 is interspersed on the water supply line 101, just before a faucet 102, measures the internal pipe pressure, and monitors the elapsed time from the time the measured pressure 106 falls from the value of reference pressure 105. Once the measured time exceeds a preset value, an internally built transmitter/receiver 502 emits an alarm signal, utilizing wireless or wired communications methods well known to a person skilled in the art. Additionally an alarm emits an audible alert sound and/or a verbal alert message through a speaker 503 and display a readable status message 504 such as, for example, LEAK or FREEZE.

FIG. 5B depicts a remote pipe cut off 505, which may be exposed to very low or freezing temperatures, showing a temperature measuring device 506 that is attached to a wireless transmitter device 507, communicatively connected to transmitter/receiver 502, which transmits its temperature readings to the inventive device 501 receiver and/or to an alternative location remote receiver, not shown.

FIG. 6 depicts a remote receiver 508 with reception capabilities 509 to receive alarm signals transmitted by the inventive device's 501 transmitter/receiver 502 and by one or more temperature measuring device wireless transmitters 507 and reproduce an audible signal through a built in speaker 510. Additionally, a readable display 511 may provide a variety of messages, including, but not limited to, a readable alarm displaying a message such as LEAK or FREEZE.

Both the remote transmitter/receiver 502 and receiver 508 require a power source, not shown, to transmit and receive data, alarms, and display instructions, and to operate an internal central processing unit.

The inventive sensor leak monitor device is an inexpensive and unobtrusive device which may be easily installed and it is ecologically sound. In the world of diminishing access to sweet water sources and increasing populations, monitoring a water leak is no longer a capricious task but an important tool to manage the vital and precious resource called water.

What I claim is:
1. A sensor leak monitor device, interspersed in a pipeline, the device comprising:
   a pressure measuring device, communicatively coupled to a pipeline, capable of determining a steady state pressure of the pipeline contents and remembering said steady state pressure value, and of measuring a dynamic state pressure of the pipeline contents;

a time-measuring device, capable of being preset to a plurality of discrete time settings and of being operated as a timer, controllable coupled to the pressure measuring device and operated such that upon the measured pressure deviating from the steady state pressure value to a lower pressure reading the time-measuring device is activated until it either the measured pressure returns to the steady state pressure value and then the time-measuring device resets itself to the preset time or the preset time is exhausted;

at least one temperature measuring device, coupled to the pipeline, capable of determining whether the pipeline contents have fallen below a preset temperature value;

an alarm device, capable of being triggered by the time-measuring device's expiration of a preset time and whenever the at least one temperature measuring device registers a temperature below a preset value; and a human interface control device, communicatively connected to the pressure measuring device, time-measuring device, at least one temperature measuring device, and alarm device, capable of controlling the time-measuring device and at least one temperature measuring device parameters and alarm device settings.

2. The sensor leak monitor device of claim 1, wherein the pressure measuring device is interspersed between a water supply pipeline and a water flow control valve.

3. The sensor leak monitor device of claim 1, wherein the pressure measuring device is a device selected from a group consisting of a manometer, a combination manometer and flow-meter, and a combination manometer flow-sensor.

4. The sensor leak monitor device of claim 1, wherein the time measuring device at least one selected from a group consisting of a mechanical timer, a piezoelectric timer, and a digital timer.

5. The sensor leak monitor device of claim 1, wherein the alarm is a device that emits at least a listenable alerting sound and lights a warning light and it is selected form a group consisting, of an audible mechanical alarm, an audible electrical alarm, and an audiovisual electronic alarm.

6. The sensor leak monitor device of claim 1, wherein the human interface control device is at least one select from a group consisting of knobs, visual displays, readable displays, push buttons, switches, and levers.

7. The sensor leak monitor device of claim 1, wherein the at least one temperature measuring device is at least one selected from a group consisting of a thermocouple, a thermometer, a temperature calibrated gage, a thermal reader, and an infrared reader.

8. The sensor leak monitor device of claim 1, wherein the at least one temperature measuring device is connected to the sensor leak monitor through wires or wirelessly.

9. The sensor leak monitor device of claim 1, wherein the time-measuring device is coupled to a pipe shut off valve, which is activated upon the expiration of the preset time.

10. A sensor leak monitor device, interspersed in a pipeline, the device comprising:

a measuring device, communicatively coupled to the pipeline, capable of measuring a steady state pressure of the pipeline contents and remembering said steady state pressure value, and of measuring a dynamic state pressure of the pipeline contents;

a time-measuring device, capable of being preset to a plurality of discrete time settings and of being operated as a timer, controllable coupled to the pressure measuring device and operated such that upon the measured pressure deviating from the steady state pressure value to a lower pressure reading the time-measuring device is activated until it either the measured pressure returns to the steady state pressure value and then the time-measuring device resets itself to the preset time or the preset time is exhausted;

at least one temperature measuring device, coupled to the pipeline, capable of determining whether the pipeline contents have fallen below a preset value;

at least one alarm device, capable of being triggered by the time-measuring device's expiration of a preset time and whenever the at least one temperature measuring device registers a temperature below a preset value;

a transmitter capable to broadcasting a signal to a remote location receiver indicating that the preset time has expired or the at least one temperature measuring device registers a temperature below a preset value;

a human interface control device, communicatively connected to the pressure measuring device, time-measuring device, alarm device, at least one temperature measuring device, and transmitter, capable of controlling the time-measuring device parameters, at least one temperature measuring device, alarm device settings, and transmitter; and a remote location receiver, capable of receiving the broadcast signal from the transmitter and activating at least one audiovisual alarm.

11. The sensor leak monitor device of claim 10, wherein the pressure measuring device is interspersed between a water supply pipeline and a water flow control valve.

12. The sensor leak monitor device of claim 10, wherein the pressure measuring device is a device selected from a group consisting of a manometer, a combination manometer and flow-meter, and a combination manometer and flow-sensor.

13. The sensor leak monitor device of claim 10, wherein the time measuring device at least one selected from a group consisting of a mechanical timer, a piezoelectric timer, and a digital timer.

14. The sensor leak monitor device of claim 10, wherein the at least one alarm is a device that emits at least a listenable alerting sound and turns on a warning light and it is selected form a group consisting of an audible mechanical alarm, an audible electrical alarm, and an audiovisual electronic alarm.

15. The sensor leak monitor device of claim 10, wherein the human interface control device is at least one select from a group consisting of knobs, visual displays, readable displays, push buttons, switches, and levers.

16. The sensor leak monitor device of claim 10, wherein the remote location receiver's audiovisual alarm is at least one selected from a group consisting of an audible alarm, a verbally audible alarm, a digital text message display, and a warning light.

17. The sensor leak monitor device of claim 10, wherein the at least one temperature measuring device is at least one selected from a group consisting of a thermocouple, a thermometer, a temperature calibrated gage, a thermal reader, and an infrared reader.

18. The sensor leak monitor device of claim 10, wherein the at least one temperature measuring device is connected to the sensor leak monitor through wires or wirelessly.

19. The sensor leak monitor device of claim 10, wherein the time-measuring device is coupled to a pipe shut off valve, which is activated upon the expiration of the preset time.

* * * * *